No. 682,806. Patented Sept. 17, 1901.
F. W. MIDGLEY.
CARDING MACHINE.
(Application filed Mar. 14, 1901.)
(No Model.)
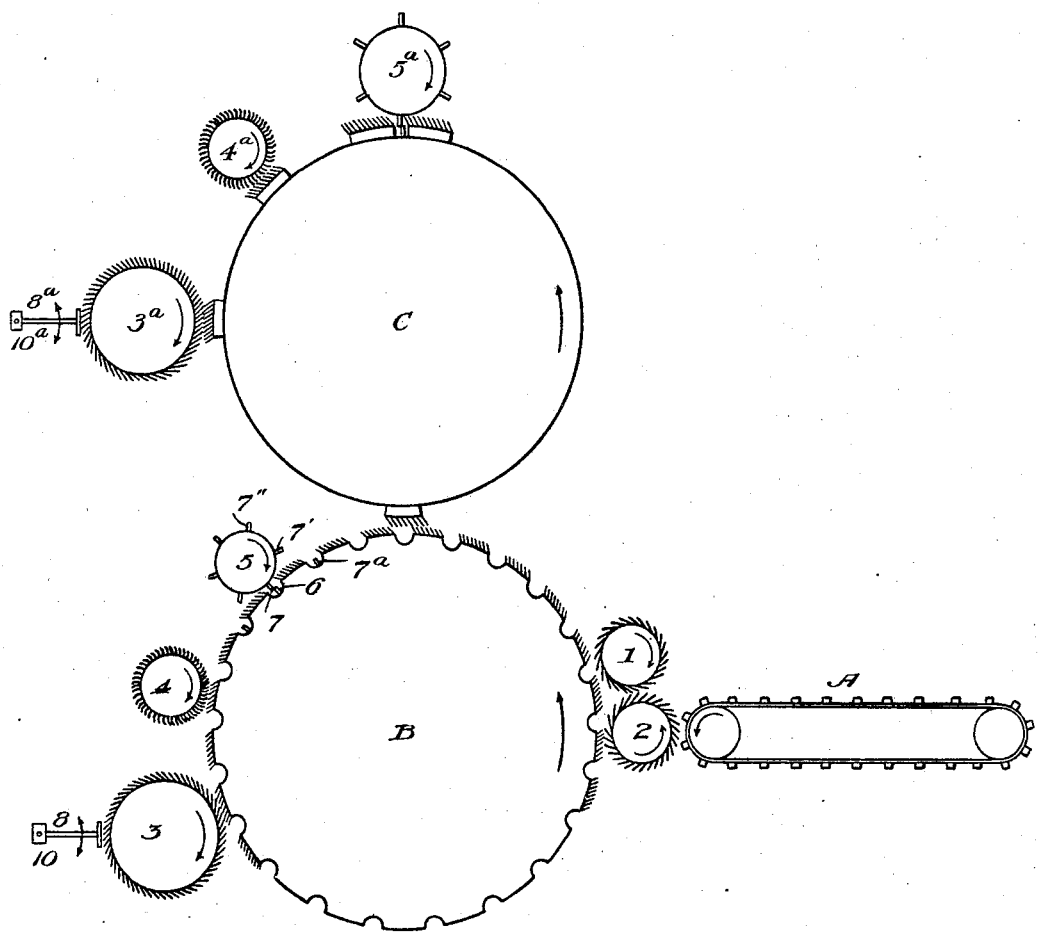
Witnesses
Inventor
Frederick W. Midgley.
Attorney

United States Patent Office.

FREDERICK W. MIDGLEY, OF PHILADELPHIA, PENNSYLVANIA, ASSIGNOR OF ONE-HALF TO GUSTAV P. GEHRING, OF SAME PLACE.

CARDING-MACHINE.

SPECIFICATION forming part of Letters Patent No. 682,806, dated September 17, 1901.

Application filed March 14, 1901. Serial No. 51,167. (No model.)

*To all whom it may concern:*

Be it known that I, FREDERICK W. MIDGLEY, a citizen of the United States, residing at Philadelphia, in the county of Philadelphia and State of Pennsylvania, have invented certain new and useful Improvements in Carding-Machines, of which the following is a specification, reference being had therein to the accompanying drawing.

My invention relates to certain improvements in machinery for preparing waste silk threads or fibers for manufacturing of silk threads.

My invention has especial reference to a machine which prepares the silk waste by straightening and cutting it in convenient lengths, so that it may be carded on a common carding-machine. In carding the silk waste one great trouble is that the silk wraps around the rolls on account of its great length and cannot be removed without great trouble and loss of time. The same trouble is found in combing it after the carding process has taken place. Now I propose to use this principle of winding around the carding-cylinders in my invention, thus making a great inconvenience into a greater advantage by cutting the fiber into nearly equal lengths after it has been wrapped around the cylinder, thus saving in the process of combing a great amount of time and labor, because the fiber is not long enough to cause trouble by wrapping around the rolls. After my process the silk can be spun on either the worsted or woolen plans.

To better understand my invention, I will refer to the drawing, which represents a vertical section, partly in side elevation, of my system of cylinders, rolls, and cutters.

A is a feed apron or belt which feeds the silk waste into the feed-rolls 1 and 2, which are provided with teeth, as indicated in the drawing. These in turn feed the waste gradually into the teeth of the large cylinder B, which has sections of card-cloth and cutter-knives arranged over its circumference at distances equal to length desired to have the silk cut. The cylinder revolves as indicated by the arrow.

5 is the rotary cutting-wheel, which carries knives 7 7' 7", &c., on its circumference, and those cutting edges mesh with the knives 6 and 7ª of cylinder B.

4 is another cylinder or fancy roller, which has long teeth, as in the drawing, and is for the purpose of removing the silk to the surface of the teeth of cylinder B.

3 is a cylinder covered with card-clothing, which has the teeth pointing as indicated in the drawing and pulls the silk waste from off the large cylinder B, due to the difference of speed of the cylinder B and cylinder 3. B revolves the faster. The teeth in 3 pick the silk waste off cylinder B and carry it around to the doffing-comb 8, which scrapes off the silk waste which has now been straightened out.

C is another cylinder like and for the same purpose as B, whose surface is very close to B.

5ª is a rotary cutter like and for the same purpose as 5.

4ª is a cylinder like and for the same purpose as 4.

3ª is a cylinder like and for the same purpose as 3.

8ª is a comb or scraper like and for the same purpose as 8. The same process takes place in this set as in the former, and the purpose is to remove the surplus waste and straighten out all knots and kinks from same, which is done by the action of the teeth of cylinder C upon the teeth of cylinder B.

The process is substantially as follows: The silk waste, which is in a matted or tangled condition and of various lengths, is fed or delivered on the apron or feed-belt A, which revolves as indicated by arrow, the apron delivering the silk waste to feed-rolls 1 and 2, which revolve slowly, as indicated by arrows. The silk waste is then caught upon the teeth of cylinder B, which revolves as indicated by arrow. It is then carried around to cylinder C', which revolves as indicated by arrow. The action of cylinder C upon B as their teeth point in opposite directions at point of contact is to remove all knots, kinks, tangles, &c., and to straighten out the fibers on both cylinders B and C. The silk waste, which is now straightened out, is now carried by cylinders B and C to rotary cutters 5 and 5ª, which cut the straightened-out silk waste into the desired lengths. The cut silk waste or fibers is then carried to cylinders 4 and 4ª, which have long wire teeth which sink into the teeth of cylinders B and C and revolve, as indicated by arrows, at a greater surface velocity, thereby removing the fibers to the surface of the teeth upon cylinders B and C. It is then carried to cylinders 3 and 3ª, which have their teeth pointing as indicated in the drawing and revolve as indicated by arrow, thereby collecting upon their slowly-moving teeth the cut silk fibers from the surface of cylinders B and C. The fibers are then carried by 3 and 3ª, as indicated by arrows, to doffer-combs 8 and 8ª, which oscillate on pivot 10, as indicated by the drawing. The action of these combs is to remove the silk fibers from the teeth of cylinders 3 and 3ª, and the fibers are then carried off by chute or other method of conveyance. The silk is now straightened out, cut in proper lengths, and prepared for the manufacture of yarn, either by the process as used for woolen or worsted yarns.

I claim—

1. In a silk-preparing machine, the combination of large cylinders having their periphery divided in sections, longitudinal cutting-knives, distributed over said periphery at equal distances, a rotary cutter whose blades mesh with knives of said cylinders, substantially as described.

2. A silk-preparing machine, consisting of feeding mechanism, straightening devices adjacent thereto, cylinders having knives, cylinders having coacting knives, cylinders for raising silk to surface and means for collecting and removing same.

In testimony whereof I affix my signature in presence of two witnesses.

FREDERICK W. MIDGLEY.

Witnesses:
R. LEAMAN,
HARRY SHOEMAKER.